W. D. MOUNT.
POWER TRANSMISSION DEVICE.
APPLICATION FILED SEPT. 4, 1920.
1,392,348.
Patented Oct. 4, 1921.
2 SHEETS—SHEET 1.
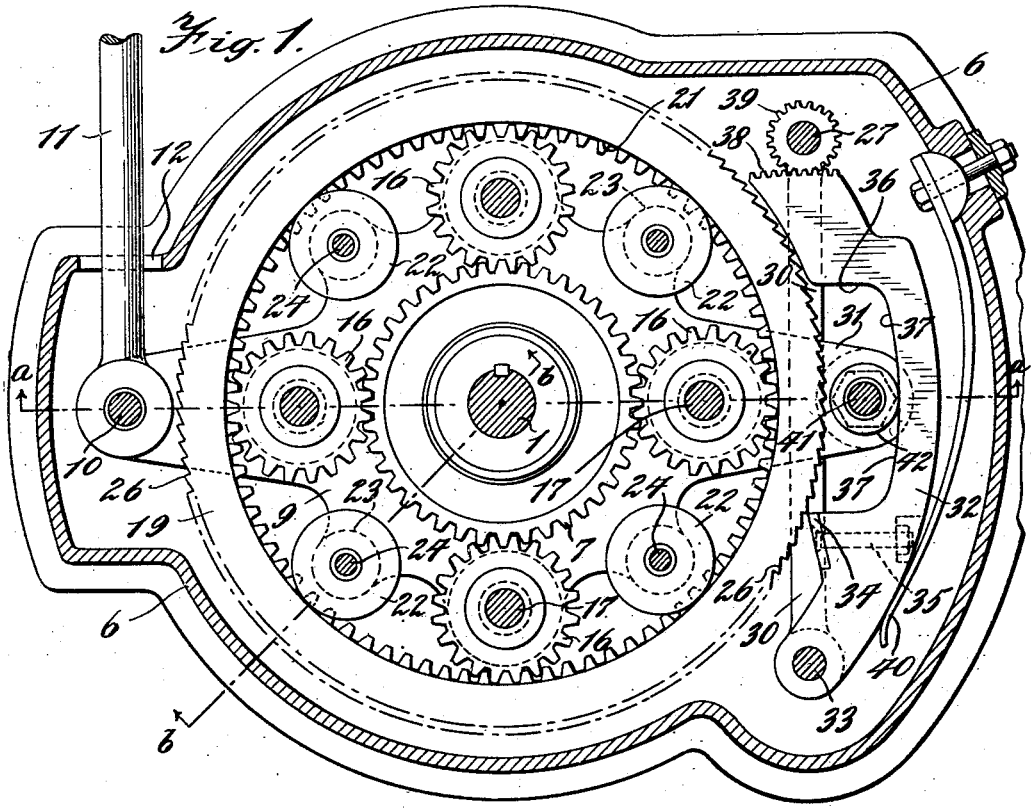
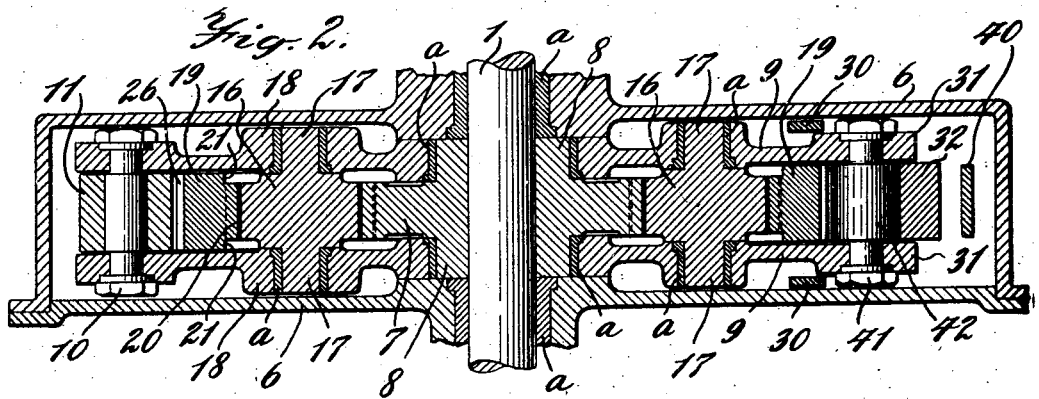
William D Mount
INVENTOR.
BY
Rosenbaum, Stockbridge & Borst
ATTORNEYS.

W. D. MOUNT.
POWER TRANSMISSION DEVICE.
APPLICATION FILED SEPT. 4, 1920.
1,392,348.
Patented Oct. 4, 1921.
2 SHEETS—SHEET 2.
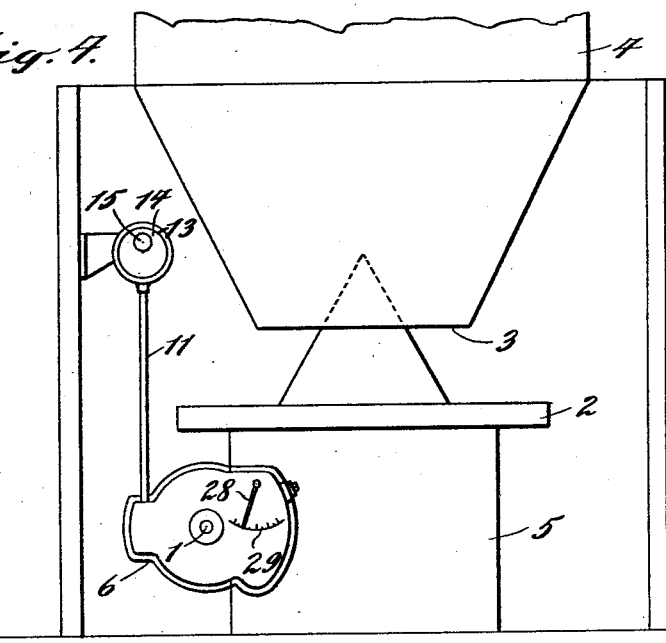
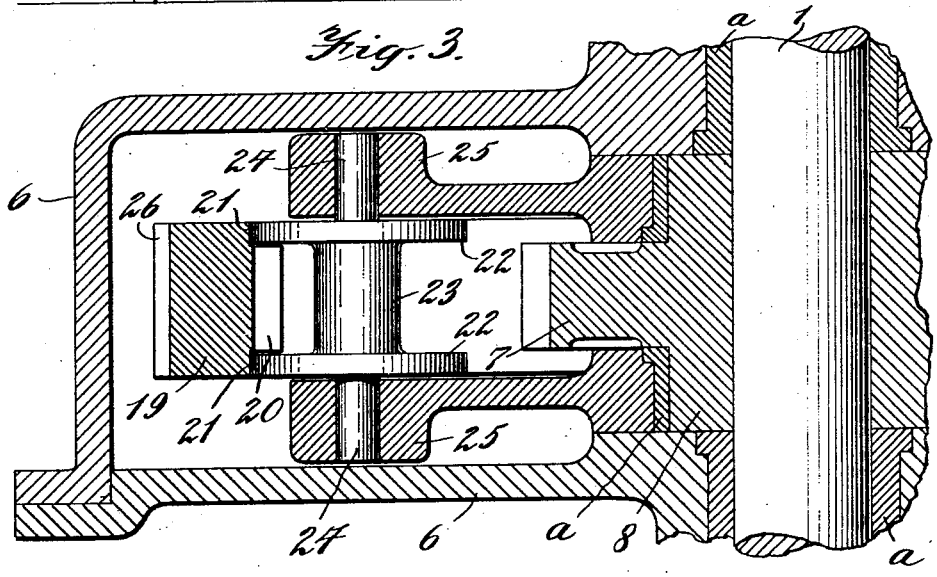
William D. Mount
INVENTOR.
BY
Rosenbaum, Stockbridge & Borsh
ATTORNEYS.

UNITED STATES PATENT OFFICE.

WILLIAM D. MOUNT, OF LYNCHBURG, VIRGINIA.

POWER-TRANSMISSION DEVICE.

1,392,348.   Specification of Letters Patent.   Patented Oct. 4, 1921.

Application filed September 4, 1920. Serial No. 408,257.

*To all whom it may concern:*

Be it known that I, WILLIAM D. MOUNT, a citizen of the United States, residing at Lynchburg, in the county of Campbell and State of Virginia, have invented certain new and useful Improvements in Power-Transmission Devices, of which the following is a full, clear and exact description.

This invention relates to devices for transmitting power from a driving member to a driven member and has for an object to provide an improved device of this type in which the speed ratio of transmission can be selectively readily varied from on idle condition up to a desired maximum, which occupies a minimum of space and which is simple and durable in construction and operation and inexpensive to manufacture.

Another object of my invention is to provide a device of this type by means of which a plurality of the transmission units can be operated from a single common source of power and each unit regulated independently of the others.

Other objects and advantages will be apparent from the following description and the novel features of my invention will be particularly pointed out in claims.

These objects are realized in the structure which will now be described in detail with reference to the accompanying drawings in which:

Figure 1 is a sectional elevation of the preferred embodiment of my invention;

Fig. 2 is a section taken substantially along the line *a—a* of Fig. 1.

Fig. 3 is a section taken substantially along the line *b—b* of Fig. 1, and

Fig. 4 is an elevation illustrating the application of my invention to continuous discharge lime kilns of the vertical type.

In the illustrated embodiment, a shaft 1 is connected through suitable gearing (not shown) to a rotary table 2 arranged beneath the discharge end 3 of a continuous vertical lime kiln 4, said shaft, being rotatably carried by the stationary support 5, which also rotatably supports the table 2. The shaft 1 passes through a two part casing 6, also carried by the support 5, in both parts of which casing it has a bearing. A gear 7 is disposed between the inner side walls of the casing 6, and is keyed to the shaft for rotation therewith. This gear is provided with a bearing hub 8 at each end, upon each of which is pivotally mounted within the casing a rocking member or element 9, the two members 9 embracing the gear 7. The members 9 are arranged in alinement, side by side, and the adjacent portions at one end are connected by a pin or bolt 10. A connecting rod 11 is pivotally attached to the pin or bolt 10 between the members 9, passes upwardly through a slot 12 in the casing 6, and at its other end is provided with a strap 13 which embraces a cam 14 eccentrically carried by a rotating shaft 15. The shaft 15 is adapted to be continuously driven by any suitable source of power (not shown) and the members 9 are therefore given a continuous rocking or oscillatory movement. A plurality of pinions 16 are rotatably supported between the rocking members 9 by means of axially disposed bearing lugs 17 on each face of the pinions which are rotatably received in bearing bosses 18 on each member 9. The pinions 16 all mesh with and are disposed in spaced relation around the gear 7, so that if the gear 7 is stationary and the members 9 are oscillated, the pinions will all be rotated. An annular ring 19 is provided with internal gear teeth 20 which inclose and mesh with all of the pinions 16. The ring 19 is also provided with internal track ways 21, one on each side of the internal gear teeth and in which are disposed the flanges 22 of the spool like anti-friction rollers 23. These rollers are rotatably carried between the members 9 by means of extensions 24 of the rollers which extend into bearing bosses 25 of the members 9. The rollers 23 and pinions 16 support the annular ring in proper position for rotation about the shaft 1. It will be seen that if the ring 19 is held against movement, a rocking or oscillatory movement of the members 9 will cause the pinions 16 to be rotated, and they in turn because of their meshing engagement with the gear 7 will impart to the latter a corresponding rotation which is transmitted to the table 2 by means of the shaft 1 and the gearing (not shown) between the shaft and the table. Likewise, if the gear 7 remains stationary, the annular ring will receive the movement. The gear 7, which may be called the driven gear, by its connection to the table 2 will normally be stationary because of its load, and during the oscillations of the members 9 the annular ring will be normally rotated in one direction and then the other about the axis of the shaft 1. The ring 19 is provided with ratchet teeth 26 upon its outer peripheral face by means of which movement of the ring in one direction can be prevented to varying extents through an adjustable pawl device, as will be presently explained.

A shaft 27 is rotatably mounted in the side walls of the casing 6 and carries on one end which projects through a wall of the casing, an indicator hand 28, by means of which the shaft can be slightly rotated and the extent of rotation indicated by reference to a scale 29 that is located upon the casing and adjacent to the end of the indicator hand. Loosely mounted on this shaft and within the casing are a pair of links 30 which are disposed adjacent the side walls of the casing. These arms embrace the free ends 31 of the rocking members 9 and have a limited oscillatory movement about the shaft 27. A pawl 32 is pivoted by means of a pin 33 between the free ends of the lever arms 30 and extends toward the shaft 27. The pawl is provided with a pawl nose 34 which may be secured thereto in any suitable manner such as by a bolt or screw 35. Between the pawl nose and the free end of the pawl and on the edge toward the annular ring I provide an elongated notch 36, and the wall 37 joining the ends of the notch acts as a cam surface and has a circular curvature, the center of curvature of which corresponds to the center of oscillation of the members 9 when the pawl is in the position illustrated in Fig. 1, which may be called its innermost position. The free end of the pawl (i. e., the end opposite from its pivot pin 33) is provided with arcuate gear teeth 38, the center of curvature of which is the pin 33, which mesh with the teeth of a pinion 39 that is secured to and rotatable with the shaft 27. The rotation of the shaft 27 by the indicator hand 28 will, through the gear teeth 38 and pinion 39, shift the free end of the pawl (the end opposite from its pivot) toward or from the annular ring. A spring device 40 secured to the casing 6 engages with the pawl 32 and exerts thereon a continuous force tending to shift the pawl 32 and lever arms 30 as a unit toward the annular ring and cause engagement of the pawl nose with the ratchet teeth of the annular ring. The free ends 31 of the members 9 are connected by a pin or bolt 41 which carries a cam roller 42 between the members for engagement with the cam surface 37.

When the parts are in the relative positions indicated in Fig. 1, the indicator hand is at one end of the scale 29 and the free end of the pawl has been shifted as near as is possible to the annular ring. The cam surface 37 of the pawl is in engagement with the roller cam 42 and the center of curvature of the cam surface is for the present, in the axis of oscillation of the rocking members 9 and of the cam roller. As the members 9 are oscillated by the eccentric on the shaft 15 and the connecting rod 11, the cam roller will roll along the cam surface 37 and hold the pawl unit with its pawl nose just out of engagement with the ratchet teeth of the annular ring. The ring will therefore be unrestrained and will oscillate in both directions with the members 9 and no turning of the shaft 1 and through it of the table 2 will occur. If now the indicator hand 28 is shifted along the scale 29, the pinion 39 will shift the free end of the pawl away from the annular ring and toward the end of the casing, the pawl turning for this purpose about the pin 33. This positions the cam surface 37 so that its center of curvature is no longer coincident with the axis of the shaft 1, but has moved upwardly (Fig. 1). As the pawl is moved about its pivot and away from the ring by the pinion 39, the nose would be withdrawn slightly from engagement with the ratchet teeth but for the action of the spring 40 in shifting the pawl and levers 30 together as a unit about the shaft 27 as a pivot to force the pawl nose into engagement with the ratchet teeth. The geared connection between the pawl and pinion 39, in effect makes the links 30 and the pawl, a single pawl unit movable about the shaft 27 as an axis, and the pawl 32 is merely an adjustable element of the combined pawl unit. When the cam roller of the members 9 is at the upper end (Fig. 1) of the notch 36, it will not, under this setting, be in engagement with the cam surface and the spring 40 will shift the pawl and levers 30 toward the shaft 1 to bring the pawl nose into engagement with the ratchet teeth. As the connecting rod 11 moves up and the member ends 31 and cam roller 42 move down (Fig. 1) the annular ring will be held against movement with the members 9, by the engagement with its ratchet teeth of the pawl nose. The pinions 16 by their engagement with the internal gear teeth 20 of the ring will be forced to rotate and in doing so will rotate the gear 7 and through it rotate the table 2. As the cam roller moves downwardly it will, at some point dependent on the extent of shifting of the pawl by the pinion 39, engage the cam surface 37 and cam the pawl and levers 30 outwardly to disengage the pawl nose from the ratchet teeth and release the annular ring. When this occurs the ring will be free to turn with the pinions and members 9, and since the gear 7 is retarded by the mechanism connecting it to the table 2, the rotation of the shaft 1 and the table 2 will cease during the remainder of the stroke. When the pinion 39 is operated to shift the pawl away from the annular ring as far as possible, the cam surface will be so placed that it will not be engaged by the cam roller at all and the pawl nose will be continuously held in engagement with the ratchet teeth 26 by the spring 40. Thus the annular ring will be held against all retrograde movement and the shaft 1 will be turned its full increment during the down stroke of the cam roller. By adjusting the pinion 39 to position the pawl at any intermediate position, the point at which the cam roller will engage the cam surface and disengage the pawl nose can be varied, and thereby the extent through which the shaft will be turned during a stroke of the cam roller will be accordingly varied. It will thus be seen that the increment of movement of the shaft 1 and table 2 for an oscillation of the members 9, can be selectively varied from no movement at all when the parts are in the position shown in Fig. 1, to the full increment of movement when the pawl is positioned so as not to have its cam surface engaged by the cam roller at all. This adjustment can be made for each kiln while the shaft 15, which is being continuously driven, is oscillating the members 9. The shaft 15 can therefore be employed to drive a battery of these devices, one of which is employed for each one of a battery of kilns, and each kiln can be regulated or rendered idle independently of the others.

Inasmuch as I contemplate applying this device to lime kilns, where the parts will necessarily have to be comparatively large, I may provide babbit bearings *a* for many of the moving parts, but this is a mechanical expedient and not *per se* a part of the invention.

It will be obvious that various changes in the details herein described and illustrated may be made by those skilled in the art, within the principle and scope of my invention.

I claim:

1. In a power transmission device, a driven shaft, a gear secured to the shaft for driving the same, a rocking member pivoted to the shaft, a plurality of pinions carried by said member and meshing with said gear, a second gear meshing with said pinions and rotatable about the shaft as an axis, means for oscillating said member, a spring-pressed pawl adapted when effective for preventing movement of the second gear in one direction, means carried by the member for engaging with said pawl to render it ineffective, and means for selectively adjusting the position of the pawl to vary the portion of each oscillatory movement of the member during which the means carried by the member will hold the pawl ineffective upon the gear.

2. In a power transmission device, a rotatable driven gear for connection to a load, a second gear rotatable about the axis of the driven gear, a rocking member pivotally mounted with its axis coincident with that of the driven gear, gearing carried by the member and meshing with the driven and second gears, means for oscillating the member, a spring pressed pivoted pawl member adapted when effective to engage with and prevent rotation of the second gear in one direction, said pawl and rocking members having co-acting means for holding the pawl member in an ineffective position, and means for adjusting the position of the pawl to vary the portion of each oscillatory movement of the rocking member during which the co-acting means will hold the pawl member in an ineffective position.

3. In a power transmission device, a ratchet wheel, means including an oscillating member for driving said ratchet wheel, a spring-pressed pawl device adapted when free to move into engagement with the ratchet wheel and prevent retrograde movement of the latter, a cam member carried by the oscillating member and adapted to engage with and cam the pawl device to ineffective position, and means for adjusting the position of the pawl device to vary the portion of each oscillatory movement of the oscillating member during which the pawl device is held ineffective.

4. In a power transmission device, a driven gear and an additional gear having coincident axes, a rocking member having its axis coincident with those of the gears, gearing between the pair of gears and mounted for oscillation with the rocking member, means for oscillating the member, a pivoted link, a pawl pivoted to the link at a distance from the pivot of the latter, a spring tending to shift said pawl into engagement with the additional gear to prevent movement of the latter in one direction, a cam device carried by the rocking member for engaging with and camming the pawl to ineffective position, and means for adjusting the pawl to vary the portion of each oscillatory movement of the rocking member during which the pawl is held ineffective.

5. In a power transmission device, a driven gear and an additional gear having coincident axes, a rocking member having its axis coincident with those of the gears, gearing between the said gears and mounted for oscillation with the rocking member, means for oscillating the member, a pivoted link, a pawl pivoted to the link at a distance from the pivot of the latter, a spring tending to shift said pawl into engagement with the additional gear to prevent movement of the latter in one direction, a cam device carried by the rocking member for engaging with and camming the pawl to ineffective position, said pawl having rack teeth thereon, and means including a pinion concentric with the pivot of the link and engaging with the rack teeth of the pawl for adjusting the position of the pawl to vary the portion of each oscillatory movement of the rocking member during which the pawl is held ineffective.

6. In a power transmission device, a driven gear and an additional gear having coincident axes, a rocking member having its axis coincident with those of the gears, gearing between the said gears and mounted for oscillation with the rocking member, means for oscillating the member, a pivoted pawl device spring pressed toward the additional gear to prevent movement of the latter in one direction and having a cam surface thereon, the center of curvature of which corresponds to the axis of the rocking member when the pawl device is in one position, a cam member carried by the rocking member and adapted to engage with the cam surface of the pawl device and cam the latter to an ineffective position, and means for adjusting the pawl device to change the position of the cam surface and thus vary the portion of each oscillatory movement of the rocking member during which the pawl is held ineffective.

7. In a power transmission device, a driven gear and an additional gear having coincident axes, a rocking member having its axis coincident with those of the gears, gearing between the said gears and mounted for oscillation with the rocking member, means for oscillating the member, a pivoted pawl device spring pressed toward the additional gear to prevent movement of the latter in one direction and having a cam surface thereon the center of curvature of which corresponds to the axis of the rocking member when the pawl device is in one position, a cam member carried by the rocking member and adapted to engage with the cam surface of the pawl device and cam the latter to an ineffective position, said pawl device having rack teeth thereon, and means including a manually operated member concentric with the pivot of the pawl device for adjusting the position of the cam surface of the pawl device to vary the portion of each oscillatory movement of the rocking member during which the pawl device is held ineffective.

8. In a power transmission device, a driven gear and an additional gear having coincident axes, a rocking member having its axis coincident with those of the gears, gearing between the said gears and mounted for oscillation with the rocking member, means for oscillating the member, a pivoted link, a pawl pivoted to the lever at a distance from the pivot of the latter and extending toward the said pivot, a pawl nose on said pawl, said pawl having a cam surface thereon between the pawl nose and the pivot of the link, the center of curvature of which surface corresponds to the axis of the rocking member when the pawl is in one position, a spring tending to shift said pawl and link toward the additional gear and cause engagement of the pawl nose and additional gear to prevent movement of the latter in one direction, a cam carried by the rocking member and disposed adjacent the cam surface of the pawl, and means adjustably connecting the free end of the pawl to the pivot of the link whereby the pawl can be selectively shifted to place the cam surface in positions to be engaged by the cam of the rocking member and the pawl nose shifted out of engagement with additional gear during the desired and variable portion of each oscillatory movement of the rocking member.

9. In a power transmission device, a ratchet wheel, means including an oscillating member for driving said wheel, a pivoted link, a pawl pivoted to said link at a distance from the pivot of the latter and disposed to extend toward the pivot of the link, a nose on said pawl for engagement with the ratchet wheel, a spring tending to shift the pawl with its nose into engagement with the ratchet wheel, said pawl having thereon between the nose and the pivot of the link a cam surface the center of curvature of which corresponds to the center of oscillation of the member when the pawl is in one position, a cam on said oscillating member adapted to engage with said cam surface and shift the pawl to ineffective position, and means mounted co-axially with the pivot of the lever and coöperating with the free end of the pawl to shift the latter about its pivotal connection to the link and change the position of the cam surface to vary the portion of each oscillating movement of the oscillating member during which the cam by its engagement with the cam surface holds the pawl in ineffective position.

10. In a power transmission device, a ratchet wheel, means including an oscillating member for driving said ratchet wheel, a pivoted link, a pawl pivoted to said link at a distance from the pivot of the latter and disposed to extend toward the pivot of the link, a nose on said pawl for engagement with the ratchet wheel, a spring tending to shift the pawl with its nose into engagement with the ratchet wheel, said pawl having thereon between the nose and the pivot of the lever a cam surface the center of curvature of which corresponds to the center of oscillation of the member when the pawl is in one position, a cam on said oscillating member adapted to engage with said cam surface and shift the pawl to ineffective position, said pawl having rack teeth on its free end, and means including a pinion mounted co-axially with the pivot of the link and meshing with the rack teeth to shift the pawl about its pivotal connection to the link and change the position of the cam surface to vary the portion of each oscillating movement of the oscillating member during which the cam by its engagement with the cam surface holds the pawl in ineffective position.

11. In a power transmission device, a shaft, a connecting rod operated thereby, a rocking member connected to said rod to be oscillated thereby, a pair of gears, gearing carried by the rocking member and meshing with said gears, connections between one of the gears of said pair and a load to be driven, means to prevent rotation of the other gear of said pair in one direction, a cam on said rocking member for rendering said means ineffective, and means for varying the portion of each oscillation of the rocking member during which the said rotation preventing means is held ineffective.

In witness whereof, I hereunto subscribe my signature.

WILLIAM D. MOUNT.